United States Patent
Hayashi

(10) Patent No.: US 7,289,615 B2
(45) Date of Patent: Oct. 30, 2007

(54) PRIVATE BRANCH EXCHANGE AND PRIVATE BRANCH EXCHANGE CONTROL METHOD

(75) Inventor: Kazunori Hayashi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1069 days.

(21) Appl. No.: 10/466,497

(22) PCT Filed: Jan. 9, 2002

(86) PCT No.: PCT/JP02/00031

§ 371 (c)(1),
(2), (4) Date: Jul. 3, 2003

(87) PCT Pub. No.: WO02/056608

PCT Pub. Date: Jul. 18, 2002

(65) Prior Publication Data

US 2004/0081194 A1  Apr. 29, 2004

(30) Foreign Application Priority Data

Jan. 10, 2001  (JP) .............................. 2001-002198

(51) Int. Cl.
H04M 1/00 (2006.01)
H04M 15/00 (2006.01)
H04M 7/00 (2006.01)

(52) U.S. Cl. ................. 379/166; 379/165; 379/112.02; 379/221.03

(58) Field of Classification Search ........... 379/112.02, 379/112.05, 156, 165, 166, 198, 221.03, 221.04, 379/221.07, 350; 370/229, 230, 235, 462
See application file for complete search history.

(56) References Cited

U.S. PATENT DOCUMENTS 4,736,409 A * 4/1988 Hasegawa et al. .......... 379/269

(Continued)

FOREIGN PATENT DOCUMENTS

JP  5-344209  12/1993

(Continued)

OTHER PUBLICATIONS

International Search Report for PCT Application No. PCT/JP02/00031 dated Feb. 12, 2002.

(Continued)

*Primary Examiner*—Quoc Tran
(74) *Attorney, Agent, or Firm*—RatnerPrestia

(57) ABSTRACT

A private branch exchange changes the load distribution according to the use condition by a main control unit and a sub-control unit. A line card comprises a first module group normally carrying out various operations in response to an instruction of the sub-control unit, a second module group carrying out various operations in response to the sub-control unit or the main control unit, a bus arbitration circuit, and an internal module bus selecting unit having a bypass selector for bypassing the bus arbitration circuit. The main control unit predicts the load on a system at the start of the system from the information stored in the incorporated line card, and determines, considering the prediction result, whether the control is made by the sub-control unit or the main control unit, for each module of each line card.

18 Claims, 4 Drawing Sheets

U.S. PATENT DOCUMENTS

| | | | |
|---|---|---|---|
| 6,452,946 B1 * | 9/2002 | Manzardo | 370/487 |
| 6,563,922 B1 * | 5/2003 | Weir | 379/325 |
| 2006/0007946 A1 * | 1/2006 | Kastenholz et al. | 370/401 |

FOREIGN PATENT DOCUMENTS

| JP | 10-13878 | 1/1998 |
|---|---|---|
| JP | 2000-307722 | 11/2000 |
| JP | 2001-325212 A | 11/2001 |

OTHER PUBLICATIONS

Form PCT/ISA/210 English Translation.

* cited by examiner

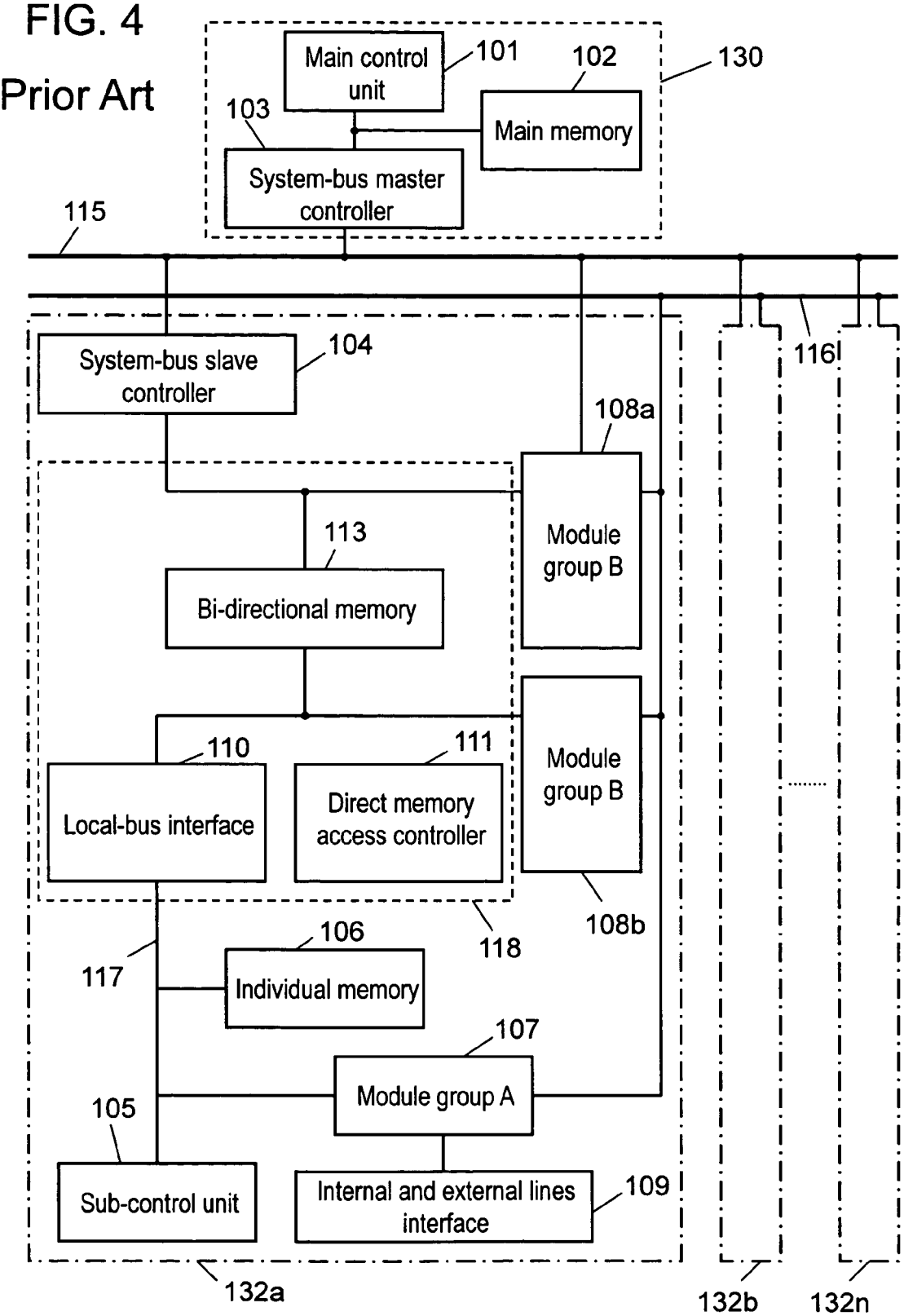

PRIVATE BRANCH EXCHANGE AND PRIVATE BRANCH EXCHANGE CONTROL METHOD

This application is a U.S. national phase application of PCT international application PCT/JP02/00031.

TECHNICAL FIELD

The present invention relates to a private branch exchange and a method of controlling the private branch exchange. More particularly, it relates to a private branch exchange in which a main control card is equipped with a main control unit and a line card is equipped with a sub-control unit, and a method of controlling this private branch exchange.

BACKGROUND ART

A variety of private branch exchanges (PBX) have been recently commercialized such as a PBX having a computer telephony integration (CTI) function, an ISDN-compliant PBX, and a wireless PBX.

In the foregoing circumstances, a PBX equipped with a plurality of central processing units (CPU) is introduced in the market for dealing with loads applied one after another. In this PBX, a main CPU (main control unit) controls mainly applications in upper layers or carries out an overall control. On the other hand a sub-CPU (a sub-control unit) is mounted to various line-cards and carries out mainly processing in the terminal that needs a real-time process. The main CPU and the sub-CPU thus play their own roles independently, so that the loads are distributed.

FIG. 4 shows a block diagram illustrating a conventional PBX, which comprises main control card 130, and a plurality of line cards 132a, 132b, . . . , 132n. Main control unit 101 of main control card 130 works as a CPU of the PBX. Main memory 102 stores the programs and data of main control unit 101. System-bus master controller 103 converts the data into a format in accordance with its own system-bus standard, converts an address, and adjusts a timing when main control unit 101 accesses respective line cards 132a-132n. System-bus 115 couples the main control card to respective line cards. Highway-bus 116 couples the respective line cards to each other.

In line-card 132a, respective sections work as follows: System-bus slave controller 104 receives an interface signal supplied from system-bus master controller 103 of main control card 130, and determines whether or not the signal accesses card 132a. Only when controller 104 finds the access to card 132a, controller 104 interprets an access mode, and converts the data received into a format of the bus standard in the line card, converts an address, and adjusts a timing. Sub-control unit 105 works as a CPU of one of line cards 132a-132n. Individual memory 106 stores the program and data of sub-control unit 105.

First module group A 107 is directly coupled to local-bus 117, which is a bus of sub-control unit 105, and carries out a process such as data conversion as a coder-decoder (codec). Module group B 108a and module group B 108b produce interface signals to be supplied to first module group A 107. Further the two groups carry out various processes such as a switching control or a gain control over audio data, which is divided and placed in time slots and passes through highway bus 116 in the PBX, and a control over communications in a conference.

Internal and external lines interface 109 is an interface connector between the line card and a group of telephone terminals. Intelligent block 118 comprises local-bus interface 110, direct memory access controller 111 and bi-directional memory 113.

Local-bus interface 110 harmonizes sub-control unit 105 with intelligent block 118 so that smooth access between unit 105 and block 118 can be executed. Direct memory access controller 111 transfers data at a high speed between individual memory 106 and second module groups 108a, 108b without any help from sub-control unit 105. Bi-directional memory 113 temporarily stores a command when the command is transferred between main control unit 101 and sub-control unit 105

In the PBX thus structured, second module group B 108a, which main control unit 101 accesses, is clearly separated in advance from second module group B 108b which sub-control unit 105 accesses, though both of the groups are disposed on the same line card. Since the loads to be applied to the main control unit and the sub-control unit can be predicted according to a system size of the PBX, namely, the number of lines to be supported, the separation and distribution of the loads are determined.

Assume that main control unit 101 works on second module group B 108b that is under the control of sub-control unit 105, in this case main control unit 101 sends a command to sub-control unit 105 via bi-directional memory 113 so that sub-control unit 105 can substitute for main control unit 101.

As discussed above, in the conventional PBX, second module group B 108b can be directly controlled only by sub-control unit 105. Therefore, when sub-control unit 105 falls into an inoperable condition, an operation of the line card having this sub-control unit 105 cannot be guaranteed. In this situation, extensions governed by this line card are in trouble.

Even if first module group A 107, individual memory 106, second module groups B 108a, 108b were accessible directly from both of main control unit 101 and sub-control unit 105, and an operation of the line card were guaranteed, plural stages of bus-arbitration circuits could be needed. Whenever main control unit 101 or sub-control unit 105 accesses a module in a lower layer, and every bus arbitration is carried out, then a speed of access becomes slower, which causes the PBX to work inefficiently.

DISCLOSURE OF THE INVENTION

The present invention addresses the problems discussed above and aims to provide a PBX that can realize a high speed access as well as guarantee an operation of a line card governed by a sub-control unit.

The PBX of the present invention comprises the following elements:

(a) a main control unit working as a CPU; and
(b) a plurality of line cards, and each one of the line cards including:
   (b-1) a sub-control unit;
   (b-2) a first module group regularly working according to an instruction of the sub-control unit;
   (b-3) a second module group working according to an instruction of the sub-control unit or the main control unit;
   (b-4) an internal bus arbitrator which arbitrates between the main control unit and the sub-control unit about a right of passing the bus; and
   (b-5) an internal module bus selecting unit including a bus arbitration circuit, a bypass selector for bypassing the bus arbitration circuit, and carrying out a routing to the second module group to be accessed from the main control unit or the sub-control unit.

The main control unit recognizes the types and the number of the plurality of line cards on startup of the PBX, then predicts the load applied to the system. Based on the prediction, the main control unit determines which one, i.e., the main control unit or the sub-control unit, controls which module individually of the module groups disposed on respective line cards.

Further, when the module to be accessed is controlled directly by at least one of the main control unit or the sub-control unit, the bus arbitration circuit is bypassed. When the module to be accessed is controlled by both of the main control unit and the sub-control unit, the inner module bus selector carries out the process of the bus arbitration circuit.

A method of controlling the PBX of the present invention, including a main control unit working as a CPU and a plurality of line cards that have their own sub-control units respectively, comprises the following steps:
 (a) recognizing the types and the number of the plurality of line cards accommodated in the PBX;
 (b) predicting a load applied to the system based on the result obtained in step (a);
 (c) determining, based on the load applied to the system, which module group individually disposed on the respective line cards is controlled by which one of the main control unit or the sub-control unit; and
 (d) bypassing a bus arbitration process when parts of a module group are controlled by either one of the main control unit or the sub-control unit.

This control method can change flexibly a distribution of the load to the main control unit and the sub-control unit based on the determination of performance and cost of the PBX system according to the recognized types and the number of line cards accommodated in the PBX. For instance, the sub-control unit on a line card independently controls a module group, or receives an instruction from the main control unit and controls a module group accordingly. This method lightens the load applied to the main control unit, and allows the access to bypass the arbitration circuit for eliminating a useless time, thereby shortening an access time.

When a line card is slotted in or slotted out to/from the PBX in active, the PBX can recognize correctly a type and a number of cards slotted in or out. The load can be thus distributed efficiently based on this information. Further, even if a sub-control unit failed, the main control unit can substitute for the failed sub-control unit and controls the module group under the failed sub-control unit.

BRIEF DESCRIPTION OF THE DRAWINGS

FIG. 4 is a block diagram illustrating a conventional PBX.

PREFERRED EMBODIMENT OF THE INVENTION

An exemplary embodiment of the present invention is demonstrated hereinafter with reference to the accompanying drawings.

Figure 1:
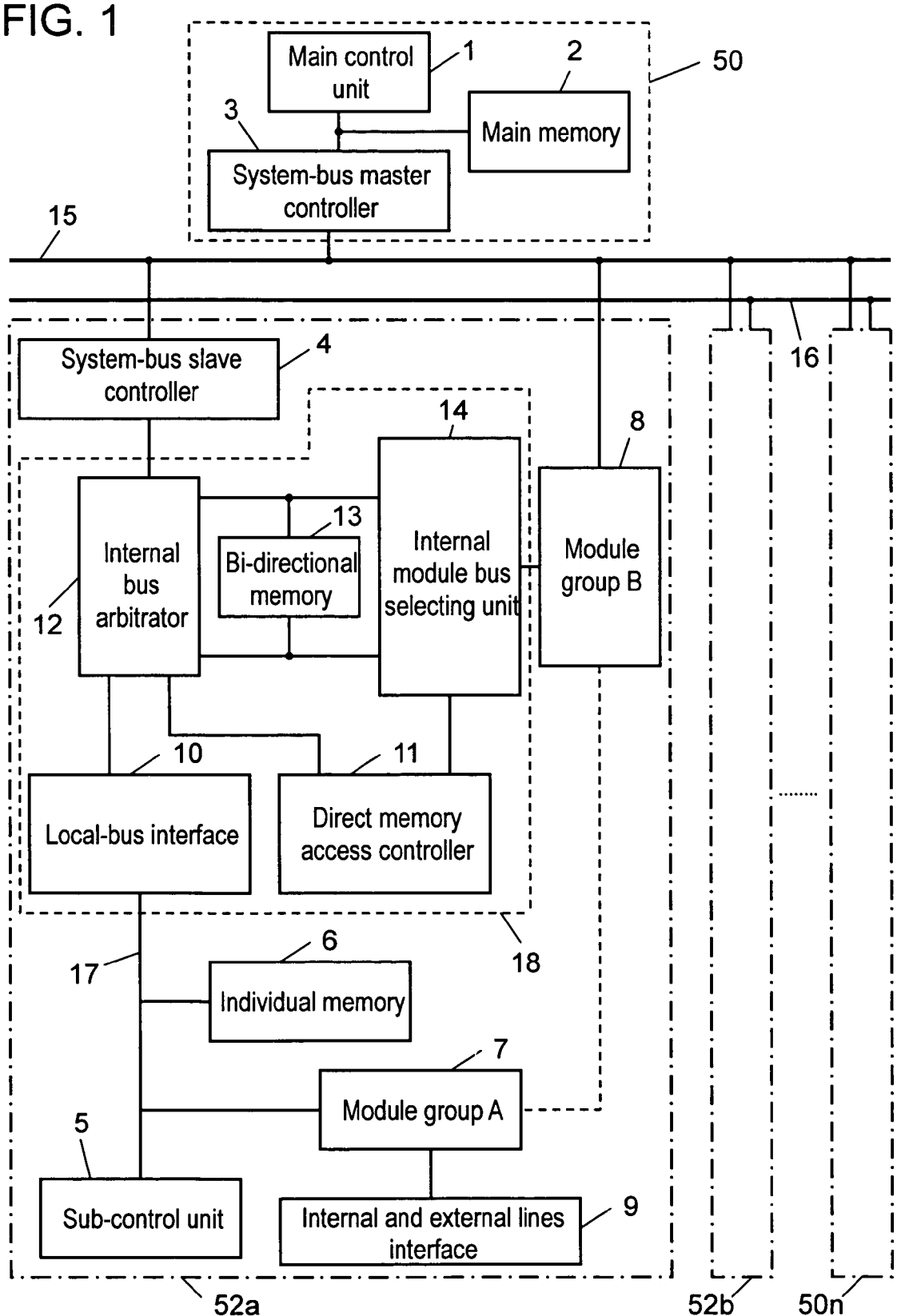
FIG. 1 is a block diagram illustrating a PBX in accordance with an exemplary embodiment of the present invention.

FIG. 1 is a block diagram illustrating a PBX in accordance with the exemplary embodiment of the present invention. The PBX comprises main control card 50 and a plurality of line cards 52a, 52b, . . . 52n. Main control card 50 includes main control unit 1, main memory 2, and system-bus master controller 3. Main control unit 1 works as a central processing unit (CPU) of the PBX. Main memory 2 stores programs and data of main control unit 1. System-bus master controller 3 converts the data into a format of its own system-bus standard, converts an address, and adjusts a timing when main control unit 1 accesses respective line cards 52a-52n.

Main control unit 1 fetches a program from main memory 2, reads and writes a data, so that the main control card executes control by itself. Main control unit 1 also gives an instruction to sub-control unit 5 described later via system-bus controller 3. This mechanism allows main control unit 1 to control the line cards indirectly. In some cases, main control unit 1 accesses directly module group A 7 and module group B 8 described later, thereby controlling the line cards directly. System bus 15 couples main control card 50 to respective line cards 52a . . . 52n in the PBX. Highway bus 16 passes audio data.

System-bus slave controller 4 provided to line card 52a receives an interface signal supplied from system-bus master controller 3 disposed on main control card 50. At this time, controller 4 determines whether or not its own line card is accessed, and only when controller 4 determines that the card is accessed, controller 4 interprets an access mode. Controller 4 then converts the signal accessing its own line card into a format of an internal bus standard, converts its addresses, and adjusts a timing.

Sub-control unit 5 works as a CPU for one of line cards 52a-52n, namely, it fetches a program from individual memory 6, reads and writes a data, so that it controls module groups A 7 and B 8 by itself. Further, sub-control unit 5 receives an instruction from main control unit 1 via bi-directional memory 13, and execute a control accordingly. Sub-control unit 5 thus lightens the load applied to main control unit 1.

Individual memory 6 stores the program and the data of sub-control unit 5. First module group A 7 is directly coupled to local bus 17, which is a bus of sub-control unit 5, and carries out processes such as data conversion as a codec. Internal and external interface 9 works as an interface connector between the line card and a group of telephone terminals.

Intelligent block 18 includes local-bus interface 10, direct memory access controller 11, bi-directional memory 13, internal bus arbitrator 12, and internal module bus selecting unit 14. Local-bus interface 10 harmonizes sub-control unit 5 with intelligent block 18 so that smooth access between sub-control unit 5 and intelligent block 18 can be realized. Direct memory access controller 11 transfers data at a high speed between individual memory 6 and module group B described later without any help from sub-control unit 5. Internal bus arbitrator 12 arbitrates between an access from system bus slave controller 4 and an access from direct memory access controller 11. At this time, internal-bus arbitrator 12 selects an access of higher priority and outputs the access to local-bus interface 10. Bi-directional memory 13 temporarily stores a command when the command is sent between main control unit 1 and sub-control unit 5.

Internal module bus selecting unit 14 has a function of bus arbitration circuit and a function of the bypass selector for bypassing the bus arbitration circuit, and arbitrates accesses to a module, and also carries out a routing for the accesses.

Second module group B 8 produces interface signals to be supplied to first module group A 7. Further, second module group B 8 carries out various processes such as a switching control or a gain control of a time-slot over audio data passing through highway bus 16 in the PBX, and a control over communications in a conference.

Figure 2:
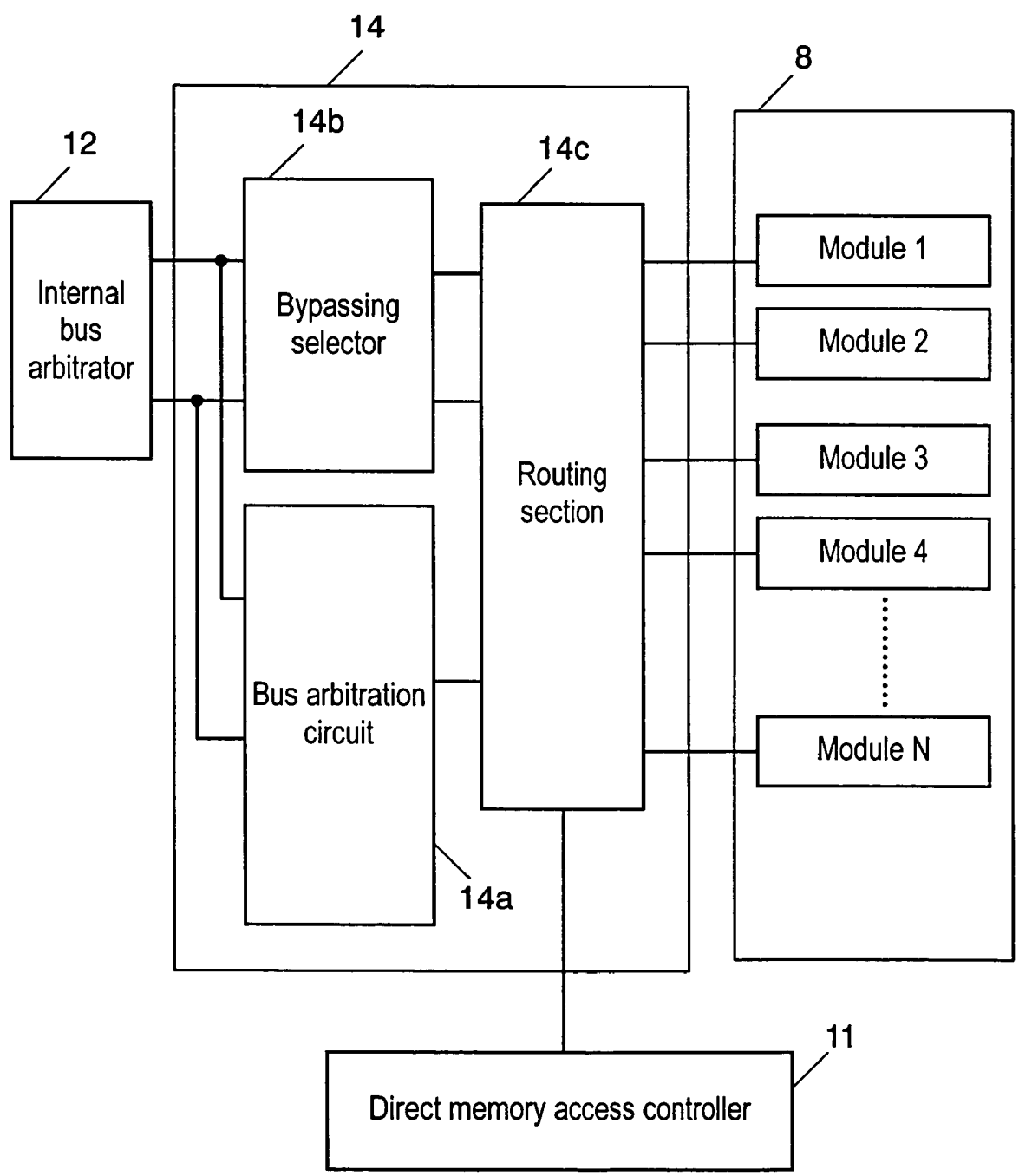
FIG. 2 is a block diagram detailing an internal module bus selecting unit and a second module group B in accordance with an exemplary embodiment of the present invention.

FIG. 2 is a block diagram detailing internal module bus selecting unit 14 and second module group B 8.

In internal module bus selecting unit 14, both of bypass selector 14b for bypassing the bus arbitration circuit and bus arbitration circuit 14a control a routing section 14c which arbitrates between accesses to an internal module and carries out a routing for the accesses. Bypass selector 14b selects modules in lower priority determined in advance to be controlled by which bus so that signals accessing those modules can bypass bus arbitration circuit 14a.

Respective line cards have configuration memory spaces, to be more specific, each one of system-bus slave controllers 4 of the respective line cards has a configuration space. System-bus master controller 3 and slave controller 4 have a configuration access function respectively, so that the types and the number of cards slotted into the PBX are recognized by main control unit 1 when main control unit 1 accesses the configuration space. Loads applied to the overall system and to the respective line cards can be thus predicted.

Each one of the configuration spaces of respective line cards stores detailed data including a type of the card. In this embodiment, the configuration space stores what kind of functions the card has. As shown in FIG. 1, the number of cards can be two or more.

Figure 3:
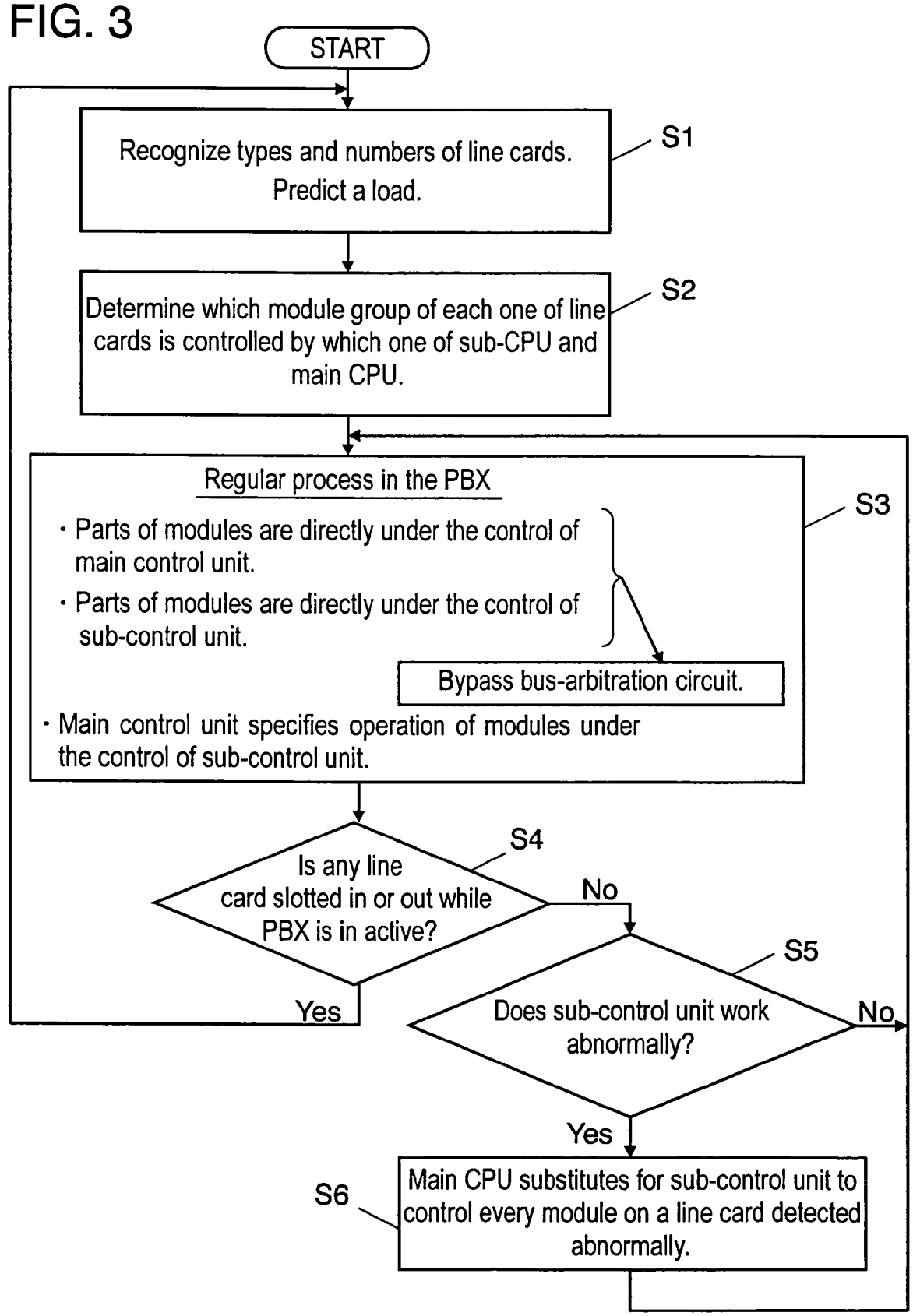
FIG. 3 is a flowchart illustrating an operation of a PBX in accordance with an exemplary embodiment of the present invention.

An operation of the PBX thus structured is demonstrated hereinafter with reference to FIG. 3. FIG. 3 is a flowchart illustrating respective processes from turning on the power supply of the PBX.

In FIG. 3, main control unit 1 fetches a program from main memory 2 at turning on the power supply of the PBX. Then control unit 1 instructs system-bus master controller 3 to access the configuration space of a first slot of the line card and obtain detailed data such as the type and the number of the card supposed to be slotted into the first slot and the number of terminals supported by the line card (S1).

Not only at the startup, but also under operating conditions of the PBX, a card can be slotted-in or slotted-out, therefore the foregoing operation can be done periodically for check purpose.

System-bus master controller 3 receives the instruction and accesses the configuration space of the first slot. At this time, in the case of a line card being inserted into the first slot, system-bus slave controller 4 reacts to this access and obtains detailed card data stored in this space. Whether or not a line card is inserted into a slot is determined by a response to a configuration cycle designating this card.

A response from the line card is obtained, and detailed data of the card is read off, then a type of the card can be recognized. Further, the foregoing configuration access is also done to the second slot and repeated up to the "n"th slot which indicates the number of the slots supported by the PBX.

Main control unit 1 obtains the information about which slot is inserted with what type of line card, and predicts the load applied to the entire system. While every slot is thus accessed, main control unit 1 recognizes which slot is inserted with what type of card before the PBX system starts operating.

Next, based on the load data obtained in step S1, main control unit 1 determines the load-distributed proportion among respective line cards for: module-control, namely, every module group of the respective line cards is determined to be controlled by main control unit 1 or sub-control unit 5.

Then main control unit 1 assigns a bus selection to internal module bus selecting unit 14 including the bus arbitration circuit bypassing selector. This assignment is carried out such that an access speed from main control unit 1 to the module groups to be controlled by main control unit 1 as well as an access speed from sub-control unit 5 to the module groups to be controlled by sub-control unit 5 becomes as high as possible. The bus selection is assigned to internal module bus selecting unit 14 including the bus arbitration circuit bypassing selector (S2).

Basically module group A 7, module group B 8, and individual memory 6 disposed on the line card can be accessed from both of main control unit 1 and sub-control unit 5 any time and free from any restrictions. However, in this embodiment, the process of step S2 is carried out in order to shorten the respective access times. The operation of step S2 is carried out to every line card inserted in the slots.

Next, in step S3, main control unit 1 and sub-control unit 5 work according to the share-plan of the load determined in steps S1 and S2 (S3). First, an access procedure of the following case is demonstrated: individual memory 6, or parts of module group A 7 and parts of module group B 8 disposed on the line card are designated to be directly controlled by main control unit 1.

Firstly, main control unit 1 designates an address of a module regardless of the module to be accessed being disposed on the line card or not, then carries out a regular access to the designated address. System-bus master controller 3 receives the access, and when controller 3 determines the access to the line card, controller 3 produces an access timing in accordance with its own system-bus standard, and outputs signals to system-bus 15.

System-bus slave controller 4 determines that the access aims at its own card among other line-cards inserted, then controller 4 produces an access timing in accordance with the internal bus standard.

Internal bus arbitrator 12 receives the access, then determines whether the access aims at module group A 7 or individual memory 6 directly coupled to a local bus, or module group B 8. When the access is found aiming at module group B 8, arbitrator 12 transfers the access with the access timing as it is to internal module bus selecting unit 14.

Internal module bus selecting unit 14 receives the access; however, selecting unit 14 has ended a bus selection in step S2. Therefore, the access bypasses the bus arbitration circuit and arrives at a desired module (module group B 8) without any delay.

Internal bus arbitrator 12 arbitrates a contention with direct memory access controller 11 when the access is found aiming at module group A 7 or individual memory 6 disposed on the line card, and arbitrator 12 outputs a bus-request signal to sub-control unit 5. Then a right of passing through local-bus 17 is obtained before the access starts. The access discussed above can be specifically carried out in the following cases.

(1) A system has a small line capacity (a small capacity having not many line cards), and a main control unit can control the overall system for itself. In this case, the system can work without a sub-control unit.

(2) A system has a large line capacity; however, only a small number of line cards are slotted in, so that a main control unit can control the overall system for itself.

(3) A sub-control unit fails.

When individual memory 6 or parts of module group A 7 and parts of module group B 8 disposed on a line card are designated to be controlled directly by sub-control unit 5, the following access procedure is carried out: Firstly, sub-control unit 5 designates an address and carries out a regular access to the designated address. Memory 6 and module group A 7 can be accessed with the access timing as it is.

In the case of module group B 8, local-bus interface 10 that receives the access changes the access timing to the one in accordance with the internal bus standard. Internal bus arbitrator 12 receives the access with the changed access timing, and transfers the access to internal module bus selecting unit 14 with arbitrating a contention with direct memory access controller 11. Internal module bus selecting unit 14 receives the access; however, selecting unit 14 has ended a bus selection in step S2. Therefore, the access bypasses the bus arbitration circuit and arrives at a desired module without any delay.

The access discussed above is specifically carried out in the following cases:
 (1) A system has a large line capacity, and a main control unit cannot control the overall system for itself, so that distributed control is needed.
 (2) When an application in an upper layer is launched, and this application applies a large amount of load to the CPU, or the case where the load to the main control unit is preferably lightened, so that the overall system desirably performs efficiently.

As discussed above, in step S2, when parts of module groups A and B are designated to be under direct control of main control unit 1 or under direct control of sub-control unit 5, the access to the module bypasses the bus arbitration circuit. Thus the access and an operation following the access are carried out without any delay.

When an operation of a module under the control of sub-control unit 5 is compulsorily changed to the one that main control unit 1 desires, the following procedure is carried out: In this case, main control unit 1 specifies an operation to the module under the control of sub-control unit 5.

First, main control unit 1 accesses bi-directional memory 13 on a line card by transmitting/receiving a command. Sub-control unit 5 monitors bi-directional memory 13 whether memory 13 stores a new command or stays vacant by periodical poling or with an interrupt signal. Further, memory 13 receives a command from main control unit 1, or addresses status information thereby receiving an instruction, then sub-control unit 5 operates in response to the instruction.

The foregoing access is carried out in the following case: In general, main control unit 1 changes the setting of a module under the control of sub-control unit 5 so that an operation of the module can be changed. In this case, since main control unit 1 cannot directly access the module, unit 1 sends a command to sub control unit 5 temporarily via the bi-directional memory, so that sub-control unit 5 changes the setting. This type of access can be carried out when a real-time process is not required.

In the next step, namely step S4, whether or not a line card is slotted in or slotted out is detected. In the following cases, main control unit 1 determines that a line card is slotted in or slotted out, and the process returns to step S1 again:
 (1) Main control unit 1 receives a signal which notices that a line card is newly slotted in.
 (2) Main control unit 1 periodically carries out a configuration access to the respective line cards, and recognizes based on the presence or absence of response to the access that some of the line cards have slotted out.

When main control unit 1 determines that a case is not applicable to either one of the foregoing two cases, the process moves on to step S5 (S4).

In step S5, an abnormal operation of sub-control unit 5 can be detected based on the content of a command communication via bidirectional memory 13. When main control unit 1 determines that sub-control unit 5 operates abnormally, the process moves on to step S6. When main control unit 1 determines that sub-control unit 5 operates normally, the process moves on to step S3.

In step S6, all the modules detected operating abnormally are switched to be controlled by main control unit 1. Therefore, without any specific process, main control unit 1 can access every module under the control of sub-control unit 5 without restraint. Main control unit 1 thus can control all the modules on the line card, so that it is assured that the system operates in a stable manner.

As discussed previously, the access bypasses the bus arbitration circuit, so that the access can be faster. Main control unit 1 thus instructs internal module bus selecting unit 14 to carry out a bus selection that entire module group B 8 should be put under the control of main control unit 1. As a result, the access between main control unit 1 and module group B 8 can be increasingly faster.

As discussed above, this exemplary embodiment proves that sub-control unit 5 can independently control a module group, or receive an instruction from main control unit 1 via bi-directional memory 13 and control a module accordingly. This mechanism allows sub-control unit 5 to lighten the load applied to main control unit 1.

When main control unit 1 or sub-control unit 5 accesses second module group B 8, internal module bus selecting unit 14 arbitrates between accesses to a module of group B 8 and carries out a routing of the accesses. This mechanism allows main control unit 1 to substitute for sub-control unit 5 to control the module group under the control of unit 5, even if sub-control unit failed.

The data about the types and the number of line cards slotted in the PBX are collected in advance. Based on the data, the load can be distributed to main control unit 1 and sub-control unit 5 and the distribution proportion can be flexibly changed according to the determination about the performance and the cost of the PBX system. Further, the accesses from main control unit 1 or sub-control unit 5 to second module group B 8 can be faster. The PBX equipped with a plurality of control units can build a distributed controlling system.

A distributed load processing and high reliability can be thus compatible, and a distributed controlling system can be switched to a central controlling system without restraint. In addition to this advantage, a system adequate for a line capacity can be build, so that the cost can be reduced.

Internal module bus selecting unit 14 can switch a bus, and recognizes detailed data about the types and the number of all the cards slotted in. Selector 14 predicts the loads applied to main control unit 1 and sub-control unit 5 based on the line capacity supported by the system and the data about the types and the number of the line cards. The prediction prompts selecting unit 14 to prepare a bypass selector that allows an access to bypass a bus arbitration circuit. The module groups thus can be switched without restriction to be controlled by main control unit 1, or sub-control unit 5, or controlled by both of units 1 and 5. When the bus arbitration circuit is not needed, the access can bypass the arbitration circuit for shortening the access time.

Internal bus arbitrator 12 arbitrates between an access from system-bus slave controller 4 and an access from direct-memory access controller 11. The arbitration prompts arbitrator 12 to select the access of higher priority and output it to local-bus interface 10.

The PBX discussed above has the following modes:
(1) a mode that allows both of main control unit 1 and sub-control unit 5 to access every module of second module group B 8;
(2) a mode that switches some modules out of second module group B 8 to be accessible only from main control unit 1 to the ones accessible only from sub-control unit 5, or vice versa.

The availability of the foregoing two modes allows an access to the modules accessible only from main control unit 1 and the modules accessible only from sub-control unit 5 to bypass the bus arbitration circuit, so that an access can be faster.

A conventional PBX includes some line cards that are not equipped with a sub-control unit for cost reduction purpose. This structure advantageously distributes the control of the respective line cards between the main control unit and the sub-control unit according to the types of the line cards; however, a problem exists in an access time. The PBX of the present invention, on the other hand, can realize a faster access.

System-bus slave controller 4 includes a configuration space therein. System-bus master controller 3 and system-bus slave controller 4 have a configuration access function respectively. This structure allows the PBX to recognize the types and the number of the card slotted in because main control unit 1 can access the configuration space.

Based on the information about the configuration space, the load applied to the overall system and the load to the respective line cards can be predicted. Therefore, at turning on the PBX or whenever a line card is slotted in or out, the access to the configuration space allows the PBX to recognize correctly the types and the number of cards newly slotted in or slotted out. Based on the information obtained from this access, the load can be distributed more efficiently.

INDUSTRIAL APPLICABILITY

The PBX of the present invention recognizes the types and the number of line cards slotted therein, thereby adjusting flexibly a load distribution between a main control unit and a sub-control unit. This adjustment lightens the load applied to the main control unit, allows an access to bypass a bus arbitration circuit when an arbitration is not needed, thereby shortening the access time. When a line-card is newly slotted in or slotted out, the PBX can recognize the types and the number of the cards newly slotted in or slotted out. Based on those data, the load can be distributed efficiently. In the PBX of the present invention, even if the sub-control unit failed, the main control unit can substitute for the sub-control unit to control the module group under the control of the sub-control unit. The PBX of the present invention can thus guarantee the operation of the line cards and realize an access at a high speed.

The invention claimed is:
1. A private branch exchange (PBX) comprising:
(a) a main control unit for working as a central processing unit (CPU); and
(b) a plurality of line cards, and each one of said line cards including:
(b-1) a sub-control unit;
(b-2) a first module group for regularly working responsive to an instruction from said sub-control unit;
(b-3) a second module group for working responsive to an instruction from one of said main control unit and said sub-control unit;
(b-4) an internal bus arbitrator for arbitrating between said main control unit and said sub-control unit about a bus right of passing through a bus; and
(b-5) an internal module bus selecting unit having a bus arbitration circuit and a bypass selector for bypassing said bus arbitration circuit, wherein when one of said main control unit and said sub-control unit accesses said second module group, said internal module bus selecting unit carries out a routing of the access,
wherein said main control unit recognizes types and numbers of said line cards at startup of the PBX for predicting a load applied to a system, and the prediction prompts said main control unit to determine which one of said main control unit and said sub-control unit controls which individual module of the first and the second module groups on each one of said line cards,
wherein when a module to be accessed is directly controlled by at least one of said main control unit and said sub-control unit, the access bypasses said bus arbitration circuit, and
wherein when the module to be accessed is controlled by both of said main control unit and said sub-control unit, said internal module bus selecting unit carries out a process using said bus arbitration circuit.

2. The PBX as defined in claim 1, wherein the PBX detects whether or not a line card out of said plurality of line cards is slotted in or slotted out while the PBX is in active, and wherein when the PBX detects one of the slot-in and slot-out of the line card, the PBX predicts a load applied to the system.

3. The PBX as defined in claim 1, wherein the PBX detects whether or not said sub-control unit operates abnormally, and an abnormality prompts said main control unit to substitute for said sub-control unit to control a module of a line card from which the abnormality is detected.

4. The PBX as defined in claim 1, wherein each one of said line cards further includes (b-6) a bi-directional memory temporarily stores a command when the command is transferred between said main control unit and said sub-control unit;
wherein said main control unit obtains the bus right using said internal bus arbitrator before accessing directly said first module group; and
wherein when said main control unit accesses indirectly said first module group, said main control unit transfers an instruction to said sub-control unit via said bidirectional memory, so that said sub-control unit executes the instruction from said main control unit for controlling an operation of a module to be controlled.

5. A method of controlling a private branch exchange (PBX) that includes a plurality of line cards, each one of the cards being equipped with a sub-control unit, and a main control unit working as a central processing unit (CPU), the method comprising the steps of:
(a) recognizing types and numbers of said respective line cards included in the PBX;
(b) predicting a load to be applied to a system based on a result obtained in step (a);
(c) determining, based on the load applied to the system, which one of said main control unit and said sub-control unit controls which individual module group provided to each one of said line cards; and (d) bypassing a bus arbitration process when a part of modules of the module group are controlled by one of said main control unit and said sub control unit.

6. The method of controlling a PBX as defined in claim 5 further comprising the step of:
   (e) executing the bus arbitration process when a module to be accessed is controlled by both of said main control unit and said sub-control unit.

7. The method of controlling a PBX as defined in claim 5 further comprising the steps of:
   (e) detecting whether or not a line card is slotted out or slotted in while the PBX is in active; and
   (f) executing again steps (a) and (b) when a line card is slotted out or slotted in while the PBX is in active.

8. The method of controlling a PBX as defined in claim 5 further comprising the steps of:
   (e) detecting whether or not said sub-control unit operates abnormally; and
   (f) controlling modules of a line card, which includes said sub-control unit detected an abnormality, with said main control unit instead of said sub-control unit.

9. A private branch exchange (PBX) comprising:
   (a) a main control unit for working as a central processing unit (CPU);
   (b) a plurality of line cards, and each one of said line cards including:
      (b-1) a sub-control unit for sharing a load;
      (b-2) a first module group for executing processes including encoder-decoder (codec) conversion of an audio signal;
      (b-3) a second module group for receiving an instruction from one of said main control unit and said sub-control unit, and executing at least one of processes including a generation of an interface signal to said first module group, a switching control of a time slot over the audio signal, and a control over telecommunication in a conference;
      (b-4) an internal bus arbitrator for obtaining a bus right of passing through a bus from said sub-control unit and transferring the bus right to said main control unit when said main control unit accesses said first module group; and
      (b-5) an internal module bus selecting unit having a bus arbitration circuit and a bypass selector for allowing an access to bypass said bus arbitration circuit, and carrying out a routing of an access,
   wherein said main control unit recognizes types and numbers of said line cards at startup of the PBX for predicting a load applied to a system, and the prediction prompts said main control unit to determine which one of said main control unit and said sub-control unit controls each module of said respective module groups disposed on each one of said line cards,
   wherein when a module to be accessed is directly controlled by at least one of said main control unit and said sub-control unit, the access bypasses said bus arbitration circuit, and
   wherein when the module to be accessed is controlled by both of said main control unit and said sub-control unit, said internal module bus selecting unit executes a process of said bus arbitration circuit.

10. The PBX as defined in claim 9, wherein said internal module bus selecting unit includes a bus switching function which has two modes; (i) every module of said second module group can be accessed by both of said main control unit and said sub-control unit, (ii) parts of modules of said second module group can be accessed only by said main control unit, which can be switched to, parts of modules of said second module group can be accessed only by said sub-control unit, and vice versa.

11. The PBX as defined in claim 9 further comprising:
   a system-bus master controller,
      wherein each one of said plurality of line cards further including a system-bus slave controller for adjusting a timing between a system-bus and each one of buses of said plurality of line cards,
      wherein said system-bus slave controller has a configuration space, and both of said system-bus master controller and said system-bus slave controller have a configuration access function respectively.

12. The PBX as defined in any one of claim 9 through claim 11, wherein said internal module bus selecting unit carries out a routing to a module to be accessed of said second module group when one of said main control unit and said sub-control unit accesses the module.

13. The PBX as defined in claim 9, wherein said internal module bus selecting unit arbitrates between two buses on an access contention.

14. The PBX as defined in claim 13, wherein the PBX detects whether or not said sub-control unit operates abnormally, and detects whether or not any line card of said plurality of line cards is slotted out or slotted in while the PBX is in active, and predicts a load to be applied to the system when the slotted-out or slotted-in is detected, and wherein when said sub-control unit is detected an abnormality, said main control unit controls modules of a line card of said plurality of line cards, from which line card an abnormality is detected.

15. A private branch exchange (PBX) comprising:
   (a) a main control unit; and
   (b) a plurality of line cards, and each one of said line cards including a sub-control unit and a plurality of modules,
      wherein said main control unit recognizes types and numbers of said plurality of line cards at startup of the PBX, and based on the recognition, said main control unit determines each module of the plurality of modules is controlled by which one of said main control unit and said sub-control unit.

16. The PBX as defined in claim 15 further comprising:
   (c) a bus selector including a bus arbitration circuit and carrying out a routing to a module to be accessed,
      wherein when a module to be accessed is directly controlled by at least one of said main control unit and said sub-control unit, the access bypasses the bus arbitration circuit.

17. The PBX as defined in claim 15, wherein the PBX detects whether or not any line card of said plurality of line cards is slotted out or slotted in while the PBX is in active, and a detection of the slotted-out or slotted-in prompts said main control unit to recognize types and numbers of said plurality of line cards, and based on the recognition, said main control unit determines each module of said plurality of modules is controlled by which one of said main control unit and said sub-control unit.

18. The PBX of claim 15, wherein the PBX detects whether or not said sub-control unit operates abnormally, and when an abnormality is detected in operation of said sub-control unit, a module included into at least one line card of said plurality of line cards, which includes said sub-control unit detected the abnormality, is controlled by said main control unit.

* * * * *